Dec. 4, 1923.

J. R. ARMSTRONG ET AL 1,476,576

INTEGRATING AND REGISTERING DEVICE FOR FLUID METERS

Filed April 14, 1921    4 Sheets-Sheet 1

INVENTORS.

Dec. 4, 1923.

J. R. ARMSTRONG ET AL 1,476,576

INTEGRATING AND REGISTERING DEVICE FOR FLUID METERS

Filed April 14, 1921     4 Sheets-Sheet 2

INVENTORS.
J. R. Armstrong
J. B. Wylie
by W. H. Doolittle
Attorney

Dec. 4, 1923.  1,476,576
J. R. ARMSTRONG ET AL
INTEGRATING AND REGISTERING DEVICE FOR FLUID METERS
Filed April 14, 1921     4 Sheets-Sheet 3
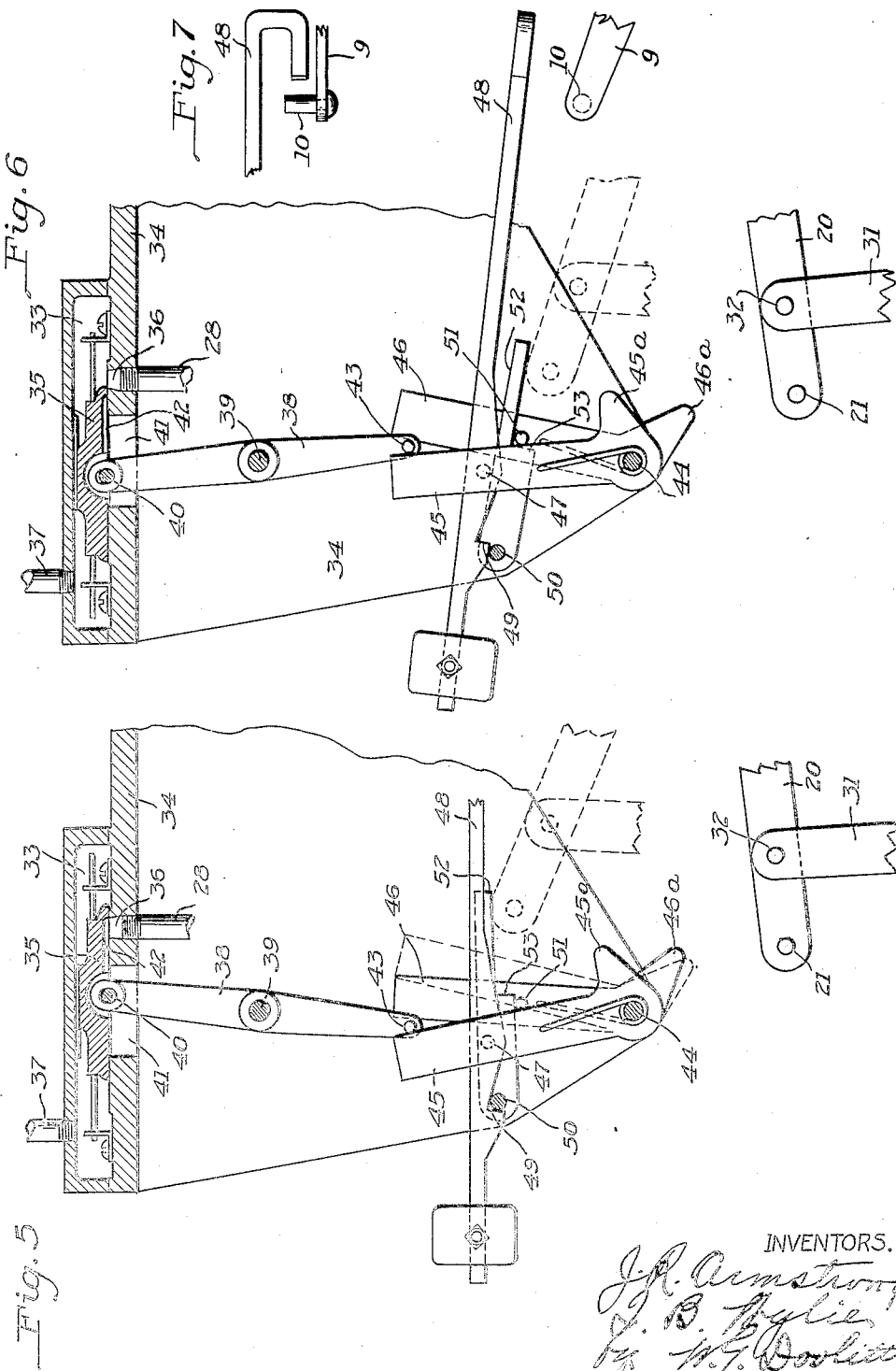
INVENTORS.

Dec. 4, 1923.　　　　　　　　　　　　　1,476,576
J. R. ARMSTRONG ET AL
INTEGRATING AND REGISTERING DEVICE FOR FLUID METERS
Filed April 14, 1921　　　4 Sheets-Sheet 4
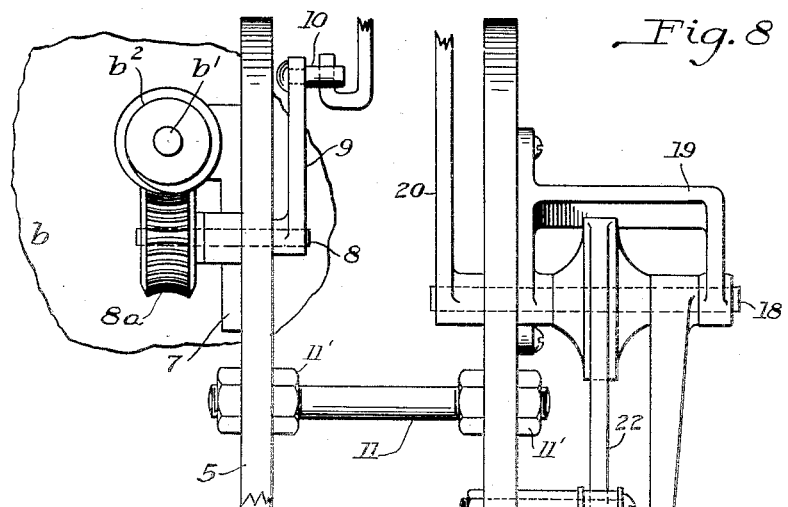
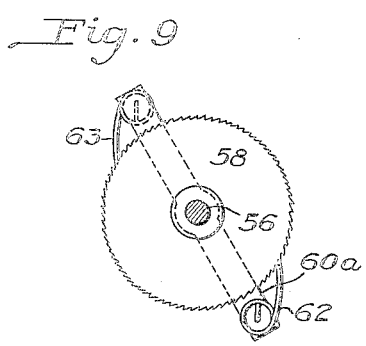
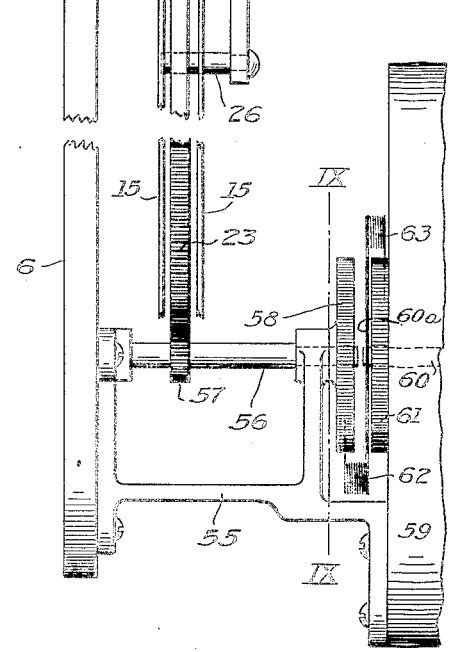
INVENTORS.

Patented Dec. 4, 1923.

1,476,576

UNITED STATES PATENT OFFICE.

JAMES R. ARMSTRONG, OF PITTSBURGH, AND THOMAS B. WYLIE, OF BELLEVUE, PENNSYLVANIA.

INTEGRATING AND REGISTERING DEVICE FOR FLUID METERS.

Application filed April 14, 1921. Serial No. 461,458.

*To all whom it may concern:*

Be it known that we, JAMES R. ARMSTRONG and THOMAS B. WYLIE, citizens of the United States, residing at Pittsburgh and Bellevue, respectively, in the county of Allegheny and State of Pennsylvania, have invented certain new and useful Improvements in Integrating and Registering Devices for Fluid Meters, of which the following is a specification.

This invention is for an integrating and registering device for fluid meters, and relates to a registering device to be used in connection with a meter actuated by the volume of fluid passing through a line for indicating the quantity of fluid passing through the meter in units of a constant value, irrespective of the actual pressure and velocity of the fluid.

It is well known that the density of a gas increases in proportion to any increase in pressure, so that, for instance, one thousand cubic feet of gas at two atmospheres pressure will equal two thousand cubic feet at a pressure of one atmosphere. In pipe lines, therefore, such as those used for natural and artificial gas, it is important that the gas be measured in terms of units of a desirable constant density, rather than by measuring the actual volume of gas at the density at which it passes through the line.

It has heretofore been the common practice to obtain the volume of gas in terms of units of a constant value by averaging the static pressure in the line for a given period, and averaging the differential pressure on two sides of an orifice meter in the pipe line, or averaging the dynamic pressure of the gas in the pipe line and then computing the result according to the familiar equation $$Q = C\sqrt{hp},$$

in which C is the constant for the orifice meter or for the pipe line; $h$, the dynamic or differential pressure in inches; and $p$, the static pressure in pounds, this being fully explained in my co-pending application filed April 14, 1921, Serial No. 461,459.

In United States Patent No. 796,620 of August 8, 1905, to T. B. Wylie, an apparatus is disclosed in which a meter indicates the volume of gas passing through the line, while a recording gauge operated by the meter records the pressure at which the gas is passed through the meter. From the readings obtained from such apparatus, the quantity of gas in units of the desired volume could be determined by a simple calculation of dividing the average pressure by the desired pressure at which the gas is to be measured, and multiplying the quotient by the actual volume registered.

It is the primary object of the present invention to provide a device which will automatically register the quantity of gas passing through the line in units of a constant value irrespective of the pressure in the line and without necessitating any calculation.

According to our invention, we provide an apparatus which includes a metering device of any well known or preferred construction for measuring the actual volume of fluid passing through the pipe line, irrespective of the pressure. This metering device controls the operation of a registering mechanism while a pressure actuated stop limits the movement of the registering mechanism, so that the registering mechanism is driven proportionally to the volume of the gas and to the pressure, and the movement thereof will be responsive to fluctuations in the pressure.

The invention may be more fully understood by reference to the accompanying drawings, in which:

Fig. 5 is a view on an enlarged scale, partly in section and partly in elevation, of a valve for controlling the operation of registering mechanism, together with the operating mechanism therefor, the valve being shown in closed position;

Fig. 6 is a similar view showing the valve in open position;

Fig. 7 is a detail showing a top view of a portion of the mechanism shown in Fig. 6;

Fig. 8 is a top view of the apparatus showing portions thereof broken away;

Fig. 9 is a section on line IX—IX of Fig. 8, showing a detail of the apparatus.

Figure 1:
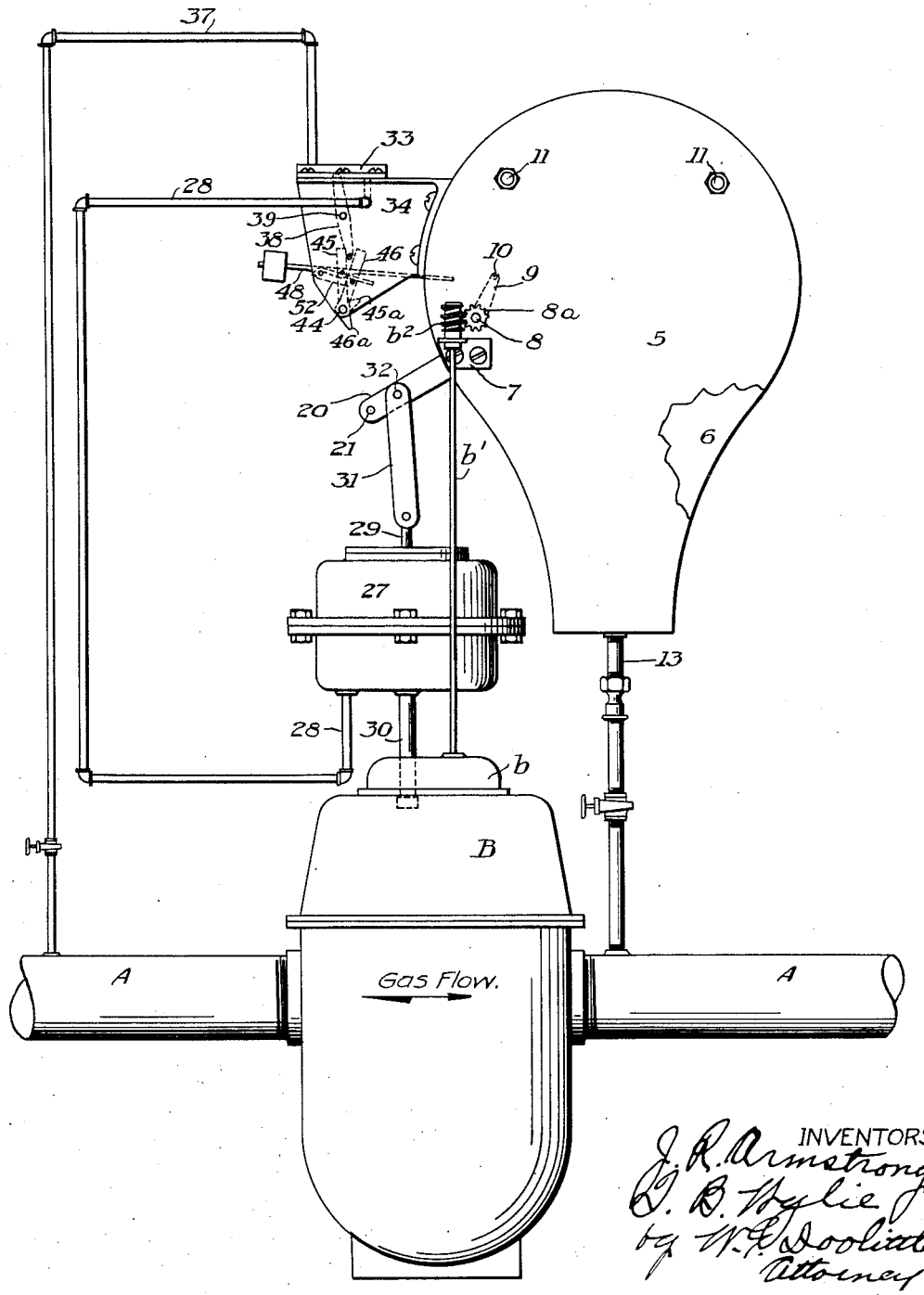
Fig. 1 is an elevational view of one side of a device constructed in accordance with our invention.

In the drawings, A indicates a pipe line, B a meter of any known or preferred construction; $b$ is the casing on said meter for containing the gearing for driving the indicators, as usually provided, but the usual indicators and dials may or may not be used. The gearing is not shown, but $b'$ represents a shaft driven by the gearing, so that, for instance, the shaft will rotate once for every thousand cubic feet of gas by actual volume that passes through the meter. The meter B is operated by the actual volume of fluid, irrespective of its pressure.

Spaced apart supporting plates are indicated at 5 and 6. The upper end of shaft $b'$ may be journalled in a bracket 7 on the back of plate 5, and on the upper end of the shaft is a worm gear $b^2$. Passing through plate 5 is a shaft 8 having a worm wheel $8^a$ meshing with worm gear $b^2$, the gearing in the device, as shown, being such that shaft 8 is rotated once with every revolution of shaft $b'$. Fixed on the end of shaft 8 between plates 5 and 6 is a tripper arm 9 having a transverse pin 10 at the end thereof, as shown clearly in Fig. 8. 11 and 11' are bolts and nuts, respectively, for maintaining the plates properly positioned.

Figure 2:
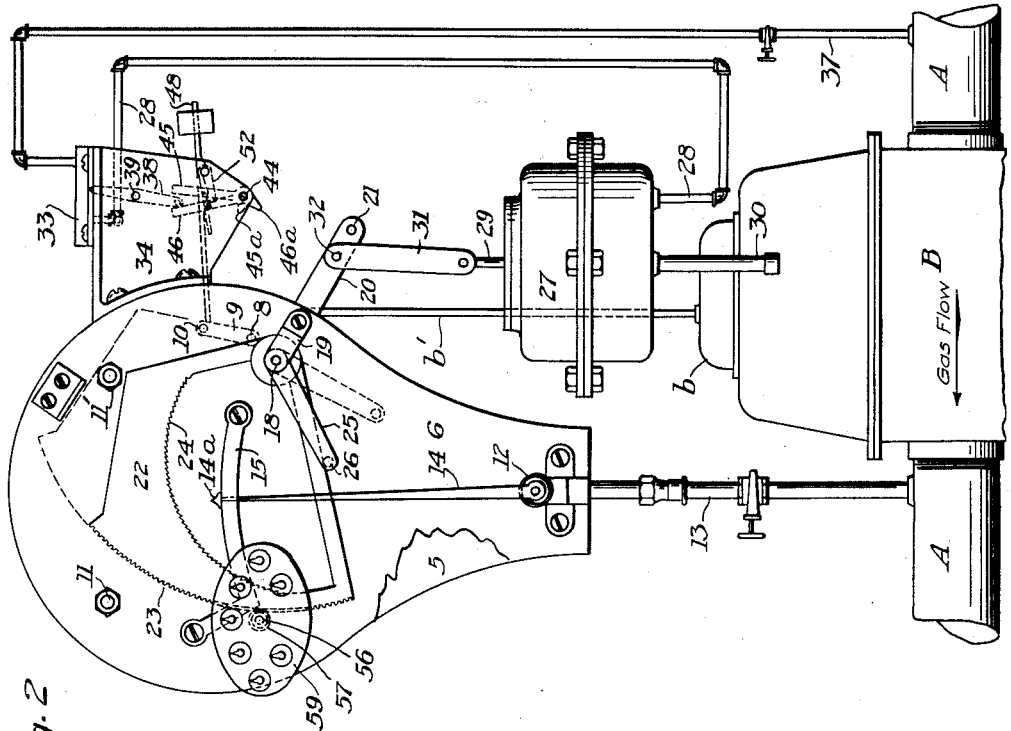
Fig. 2 is a similar view of the other side, or front, of the apparatus.
Figure 3:
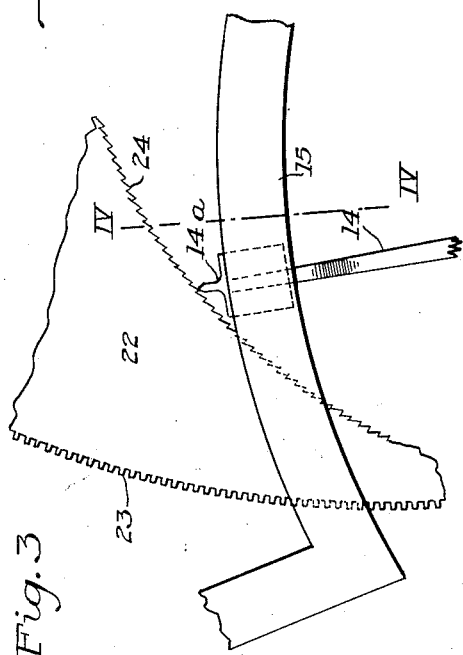
Fig. 3 is a detail view of the pressure actuated stop and the guide therefor, together with a portion of the mechanism with which it cooperates.
Figure 4:
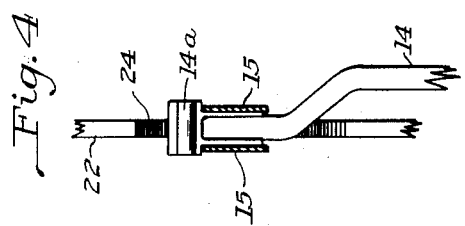
Fig. 4 is a section on line IV—IV of Fig. 3.

Mounted at the base of plate 6 is a pressure gauge 12 of suitable construction, to which the line pressure is communicated through pipe 13. The gauge has an indicator arm 14, the upper end of which is guided between spaced apart curved strips 15, as shown in Figs. 3 and 4, and at the top of indicator and slidable along the strips, is a stop $14^a$. The stop is in its zero position when it is moved to the left of Fig. 2 to the limit. Zero, as indicated by this gauge, is preferably absolute pressure and not atmospheric pressure.

Passing through plate 6 near the edge thereof, is a shaft 18, while a bracket 19 on the outer face of plate 6 provides a journal for the outer end of the shaft. On the end of the shaft 18 between the plates is fixed an arm 20, the outer end of which is provided with a transverse pin 21.

Rotatable about shaft 18 is a frame 22 which has a segmental rack 23 on its periphery. The segmental rack is guided between the guide strips 15 for the indicator, as shown in Figs. 3 and 4. The frame is provided with a curved serrated portion 24, the curve of which is plotted to bear a certain relation to the arc in which the indicator stop $14^a$ moves and to the segmental gear rack 23, which curved portion contacts with stop $14^a$ to limit the downward movement of the frame.

Fixed to shaft 18 is another arm 25 which extends in a direction opposite to arm 20. On the outer end of this arm is a projection or pin 26 adapted to extend under the lower edge of frame 22. This arrangement permits frame 22 to rock downwardly by gravity when arm 25 moves downwardly, until curved portion 24 thereof contacts with stop $14^a$ to limit any further movement thereof, but the arm 25 can continue to move downward. When the arm 25 again swings upwardly, the pin 26 will come into contact with frame 22 and return it to its normal raised position.

Thus, it will be seen that the downward movement of the frame will be proportional to the static pressure in the line, by reason of stop $14^a$ being actuated by the static pressure. The curve of portion 24 is so plotted that the frame may be rocked a given distance for one atmosphere of pressure, and an equal distance additional for every increase of one atmosphere. In other words, it would be rocked five times further at a pressure of five atmospheres than it would be at a pressure of one atmosphere.

For rocking arm 25 to effect the movement of the frame, we provide a motor of any suitable kind such, for instance, as a diaphragm motor 27 to which fluid under pressure is supplied through pipe 28. At 29 is a rod reciprocated by the diaphragm motor, 30 being a guide for the lower end of the rod. The projecting upper end of rod 29 is pivotally connected with links 31 which, in turn, are pivotally connected at 32 with arm 20 on shaft 18.

For controlling the operation of the motor 27 to rock the frame 22 once for every rotation of trip arm 9, a valve chamber 33 is provided on a suitable bracket 34 at one side of the supporting structure, and in the valve chamber is a reciprocable valve 35 adapted to close and open port 36 with which pipe 28 communicates. Fluid under pressure is supplied to the valve chamber through pipe 37. This fluid may be obtained from any suitable source, but we have shown the pipe as connected to line A. The valve, which is shown in detail in Figs. 5 and 6, is reciprocated by a lever 38 pivoted to bracket 34 at 39 and pivoted to valve 35 at 40, the lever passing through slot 41 over which the valve forms an air tight seal. Groove 42 in the valve permits the pressure in the motor 27 and pipe 28 to be relieved when the valve is closed. On the lower end of lever 38 is a transversely extending projection or pin 43.

Pivoted at 44 are two levers 45 and 46 on which are feet or cams $45^a$ and $46^a$, respectively. Lever 45, as shown in Figs. 5 and 6, is urged toward the right by a suitable spring and lever 46 is urged in the opposite direction. Pivoted at 47 on lever 45, is a trip lever 48 having a shoulder 49 thereon adapted to engage pin 50, as shown in Fig. 5. One end of the lever 48 is weighted, and the other end, shaped as shown in Fig. 7, extends into the path of travel of the pin 10 on trip arm 9. The other lever, 46, has a pin 51 thereon, and a locking lever 52 pivoted at 50, having a shoulder 53, is adapted to normally engage the pin 51 to hold the lever in the position shown in Fig. 6.

In operation, the parts are as shown in Fig. 5, but lever 46 is in the dotted line position. Rotating trip arm 9, with pin 10, presses down on one end of trip lever 48, disengaging shoulder 49 and pin 50. The spring then acts to move lever 45 to the right, and the upper end of lever 45 in so moving engages pin 43 on lever 38 and opens the valve 35. Motor 27 then actuates to swing lever 20 upwardly. Pin 21 on lever 20 engages cam 45$^a$ on lever 45, and returns this lever to the position shown in Fig. 5 without shifting lever 38, and the arm continues to move upwardly. When it lifts lock lever 52 sufficiently high, pin 51 is disengaged from contact with the shoulder 53 and lever 46 is moved to the left to the full line position shown in Fig. 5, rocking lever 38 to closed position. The valve then being closed, arm 20 is rocked downwardly, and pin 21, engaging foot 46$^a$ resets lever 46 so that the parts are then all automatically set for the next operation. Thus, the frame 22 rocks or oscillates once to every rotation of the trip arm 9.

Journalled in a bracket 55 (see Fig. 8) on the outer face of plate 6 is a shaft 56, on which is a pinion 57 meshing with the teeth on segmental rack 23. On the outer end of shaft 56 is a ratchet wheel 58. Supported on bracket 55 is a registering device 59 of usual construction. The main shaft for driving the indicators of the registering device is indicated at 60 and is in alinement with shaft 56. Surrounding the projecting outer end shaft 60, but fixed to the casing of the registering mechanism, is a ratchet wheel 61. On the outer end of shaft 60 is a cross arm 60$^a$ on one end of which is a spring pressed pawl 62 which engages ratchet wheel 58. On the other end of the cross arm is a spring pressed pawl 63 engaging ratchet 61. The arrangement is such that when the frame 22 rocks downwardly, the shaft 56 will rotate, but such rotation will not be transmitted to shaft 60 of the registering device. On the upward movement of the frame, the shaft 60 will be rotated.

In operation, assume that one revolution of shaft 60 operates the registering device to indicate one thousand cubic feet, at a pressure of four ounces above atmospheric pressure, which pressure, it may be assumed, is the pressure at which the gas is to be sold. Assume that a thousand cubic feet of gas, actual volume, has passed through the metering device B, and that the pressure is 44.85 pounds. Assuming that one atmosphere is 14.7 pounds and the gas is to be sold at a pressure of four ounces (.25 pounds), then the volume in units at a pressure of four ounces equals the quotient of 44.85 divided by 14.95 (14.7 plus .25) times one thousand. Solving the equation, the quantity equals 3×1000 or 3000, which is the number of cubic feet at a pressure of four ounces the one thousand cubic feet at pipe line pressure is equivalent to.

In the operation of our device, with these pressures assumed, when a thousand feet of fluid at pipe line pressure shall have passed through the meter B, trip arm 9 will have rotated once, operating motor 27 to rock frame 22. Stop 14$^a$ of the indicator 14 will allow frame 22 to rock downwardly sufficiently far to rotate shaft 56 through pinion 57 three complete revolutions, which in turn will rotate shaft 60 three revolutions and the indicators of the register will be moved accordingly. If the next thousand feet pass through at a lower or higher pressure, indicator stop 14$^a$ will be moved proportionately and the amount registered will vary accordingly. Thus, the device will automatically register in units of a given value the average equivalent for every thousand feet of fluid at pipe line pressure which passes through the meter B.

It will be obvious that various changes could be made in the mechanical construction and the gearing of the device, and that various types of motors might be used for operating the mechanism, it only being necessary that the machine function substantially in accordance with the well known Boyles' law, that, for the same temperature, the density of a gas is proportional to its pressure, and that the temperature remaining the same, the volume of a given quantity of gas is as the pressure which it bears.

What we claim is:

1. A device for registering in units of constant value the flow of fluid through a line comprising a registering means, means for driving the registering means proportionally to the pressure in the line, a meter, and means whereby the said driving means is actuated every time a given volume of fluid passes through the meter, said driving means being independent of but controlled by the meter.

2. A device for registering in units of constant value the flow of fluid through a line including a registering means, intermittently operated pressure controlled means for actuating the registering means, and means directly controlled by the volume of fluid for effecting the intermittent operation of said actuating means.

3. A device for registering in units of constant value the flow of fluid through a line, comprising a registering device, gearing for actuating the registering device, means for limiting the movement of the gearing proportionally to the pressure in the line, means for driving the gearing, and means including a meter controlled by the volume of fluid passing through the line for effecting the actuation of said driving means, said driving means being independent of but controlled by said meter.

4. The combination with a pipe line, of a registering mechanism for indicating the flow of fluid through the line in units of a constant value, comprising a meter actuated by the volume of fluid passing through the line, a registering means, gearing for driving the registering means, means for limiting the movement of said means proportionally to the pressure in the line, and a motor controlled by said volume meter for actuating the gearing.

5. The combination with a mechanical meter, of gearing, a motor for effecting the actuation of the gearing every time a predetermined volume of fluid has been passed through the meter, means controlled by the pressure of the fluid passing through the meter for limiting the movement of the gearing proportionally to the pressure, and a registering device actuated by the gearing.

6. The combination with a motor, of gearing driven thereby, pressure actuated means for limiting the movement of the gearing while permitting the motor to actuate, a registering device controlled by the gearing, means for intermittently effecting the operation of the motor, a mechanical meter, said last named means being controlled by the operation of said mechanical meter.

7. The combination with a fluid pressure motor, of a valve for controlling the operation thereof, levers for actuating the valve, means for intermittently operating one of the levers to open the valve, means actuated by the motor for closing the valve and resetting the levers into normal closed position, registering mechanism driven by the motor, and a pressure controlled device for limiting the movement of the registering mechanism.

8. The combination with a pipe line, of means for measuring the flow of liquid through the line including a mechanical meter actuated by the fluid in the line, a member rotated by the meter, a registering device, mechanism whose operation is controlled by the rotation of said member for moving the registering device, a pressure actuated means for limiting the movement of the mechanism proportionally to the pressure in the line, and means independent of the meter for driving the mechanism.

9. The combination with a pipe line, of means for measuring the flow of fluid through the line in units of a constant value, including an oscillatable frame, a segmental rack on the frame, a registering device driven by the rack, a pressure operated device for limiting the movement of the frame proportionally to the pressure in the line, a motor for effecting the movement of the frame, a meter, and means driven by the meter for controlling the actuation of the motor.

10. The combination with a pipe line, of a mechanical meter actuated by the volume of fluid passing therethrough, a registering device, and means including a motor interposed between said meter and the registering device and controlled by said meter arranged to move the registering device proportionally to the pressure in the line, whereby the values of the quantities indicated by the registering device are constant, being proportional to the pressure and the volume of fluid passing through the line.

In testimony whereof we affix our signatures in presence of two witnesses.

JAMES R. ARMSTRONG
THOMAS B. WYLIE.

Witnesses:
Lois Wineman,
Wm. H. Parmelee.